United States Patent [19]

Dea et al.

[11] Patent Number: 5,077,513
[45] Date of Patent: Dec. 31, 1991

[54] PORTABLE BATTERY POWER SOURCE

[75] Inventors: William S. Dea, Bloomington; Michael A. Goetzke, Richfield, both of Minn.

[73] Assignee: Century Mfg. Co., Minneapolis, Minn.

[21] Appl. No.: 605,785

[22] Filed: Oct. 30, 1990

[51] Int. Cl.⁵ .............................................. H01M 2/10
[52] U.S. Cl. ........................................... 320/2; 320/25
[58] Field of Search ....................................... 320/2, 25

[56] References Cited

U.S. PATENT DOCUMENTS

| | | | |
|---|---|---|---|
| 2,565,273 | 9/1950 | Shuler et al. | 320/2 |
| 2,626,972 | 1/1953 | Marquardt | 320/25 |
| 2,659,042 | 5/1953 | Anderson et al. | 320/2 |
| 4,106,583 | 8/1978 | Nemeth | 180/6.5 |
| 4,161,682 | 7/1979 | Corvette | 320/2 |
| 4,215,306 | 7/1980 | Mace | 320/2 |
| 4,667,141 | 5/1987 | Steele | 320/2 |
| 4,902,955 | 2/1990 | Manis et al. | 320/2 |
| 4,967,733 | 11/1990 | Rousseau | 182/13 |

FOREIGN PATENT DOCUMENTS 1225412 2/1960 France .................................. 320/2

OTHER PUBLICATIONS

Roll-Around Starting Equipment—Model 6127, page, distributed by Associated Equipment Corporation of St. Louis, Missouri.

Primary Examiner—Steven L. Stephan
Assistant Examiner—Thomas M. Dougherty
Attorney, Agent, or Firm—Dorsey & Whitney

[57] ABSTRACT

A portable battery power source includes a frame with a pair of upwardly angled support members, a battery supporting tray for holding a source battery, a pair of suspension members extending upwardly from the tray for connecting the tray to the pair of support members attached to a wheel-mounted frame. Panels form the frame and also a housing for protecting the source battery from the elements. The power source housing also has a cable compartment for holding a set of cables for connecting the source battery to an electrical load and space for a charging circuit used for recharging the source battery when it is not in use and a control panel at which the device's functions are controlled.

16 Claims, 1 Drawing Sheet

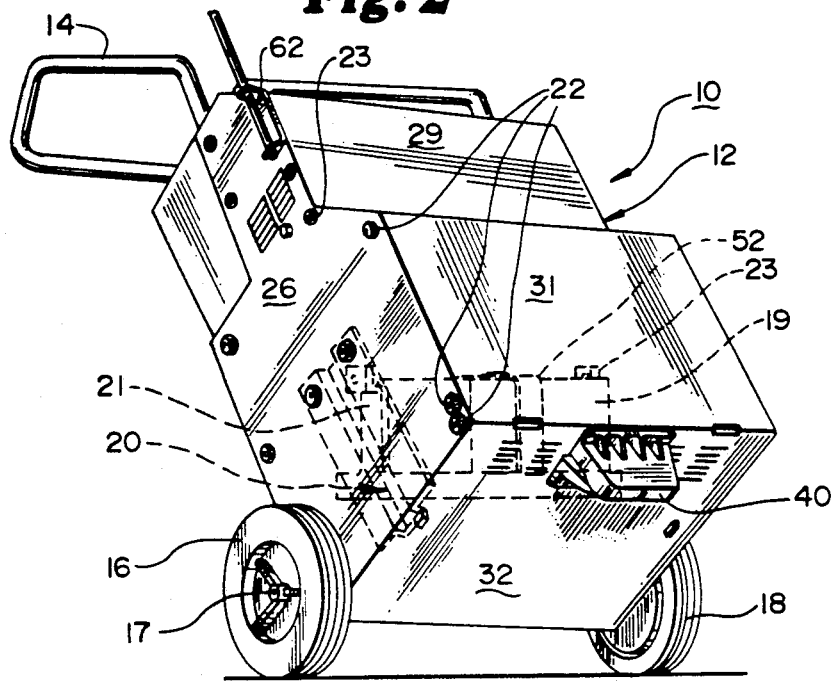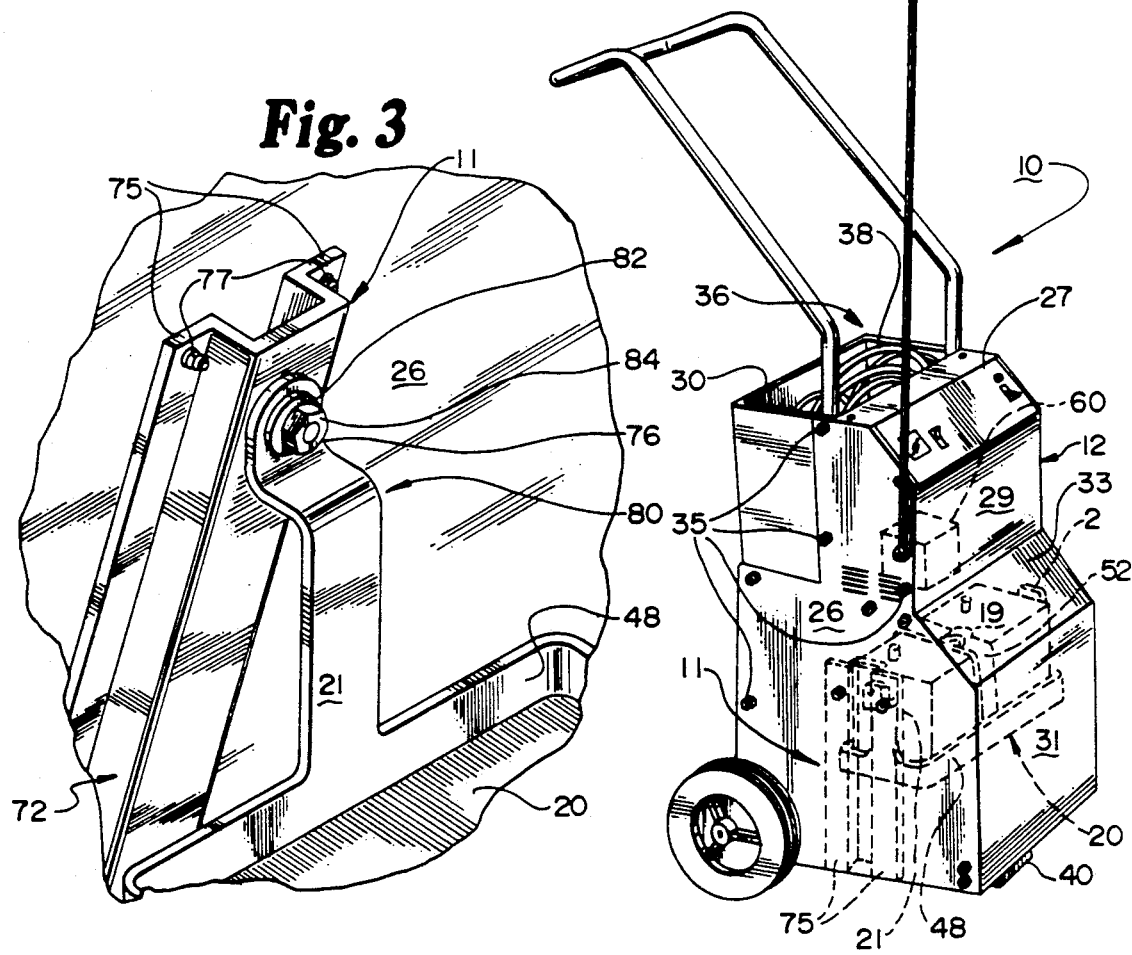

PORTABLE BATTERY POWER SOURCE

TECHNICAL FIELD

The present invention relates generally to the field of manually powered carts for transporting an auxiliary power supply to jump start motor vehicles and for other similar applications where a portable battery power supply is useful. More particularly, the present invention relates to a cart for transporting liquid-containing batteries in a level position, regardless of the angle of the cart relative to the ground.

BACKGROUND OF THE INVENTION

Hand held, manually powered carts for transporting an auxiliary power supply are known in the prior art. While the prior art devices are capable of carrying and transporting an auxiliary power supply such as a battery, their design has limited their usefulness in some applications. One of the problems with the present cart devices is their unsuitability for carrying liquid-containing batteries, such as the common lead-acid batteries, in a level position. Tilting such batteries can result in spillage of the corrosive acid contents of the batteries, potentially making them inoperable or less effective as auxiliary power supplies. Additionally, spillage of the corrosive acid results in environmental pollution, can affect ground water supplies, and may cause harm to the epidermis or clothing of any individual coming in contact with it. If the user must strain to maintain the cart in a position in which the battery remains level, the maneuverability and ease of use of the cart becomes limited. A portable battery power source that solves these problems would provide a decided advantage over the prior art.

SUMMARY OF THE INVENTION

The problems outlined above are in large measure solved by the portable battery power source in accordance with the present invention. The portable battery power source hereof is a manually operated device capable of maintaining a liquid-containing battery supported on the cart in a level position, regardless of the angle of the cart relative to the ground.

The portable battery power source disclosed herein includes a frame with a pair of upwardly angled support members, a battery supporting tray for holding a source battery, a pair of suspension members extending upwardly from the tray for connecting the tray to the pair of support members and a housing encompassing the frame for protecting the source battery from the elements. The power source also has a cable compartment for holding a set of jumper cables for connecting the source battery to an electrical load, space for a charging circuit used for recharging the source battery when it is not in use and a control panel at which the device's functions are controlled.

BRIEF DESCRIPTION OF THE DRAWINGS

FIG. 1 is a perspective view of a portable battery power source in accordance with the present invention;

FIG. 2 is a fragmentary perspective view of the portable battery power source with the carrier device tilted back and showing the battery remaining level;

FIG. 3 is an enlarged, fragmentary view of the portable battery power source showing the internal details of the battery supporting structure with the battery removed.

DETAILED DESCRIPTION OF THE INVENTION

Referring to the drawings, the portable battery power source 10 in accordance with the present invention generally comprises a frame-housing 12, a transport handle 14 extending upwardly and outwardly from the frame 12 for manually moving the battery power source 10, and two wheels 16, 18 connected by an axle 17 providing transport means on which the battery power source 10 moves. Within the frame 12 a battery 19 is supported on tray 20, which, in turn, is supported on a pair of suspension members 21, 21 that rotatably connect the tray 20 to a pair of support members 11, 11 (see FIGS. 2 and 3, which show only one of said support members 11). The tray 20, suspension members 21, 21 and support members 11, 11 form a gimbal means for holding level the battery 19 (typically, a liquid-containing, lead-acid battery), regardless of the position of the frame 12.

The frame 12 serves as both overall support and as an enclosure. It has two parallel side members 26, 26 joined by a bottom panel 32. The axle 17 passes through the lower rear corner of the side members 26, 26. The front of the frame 12 is enclosed by upper 29 and lower 31 front panel members. The lower front panel member 31 has an angled top panel 33 and serves as an access door for the battery 19, when removable fasteners 22 are removed at both side members 26, 26, allowing the panel member 31 to rotate on an axis defined by the pair of fasteners 23,23 (only one of which is shown in FIG. 2) that connect to flanges (not shown) along the upper side edges of the angled top panel 33. The upper front panel member 29 also has an angled top panel 27, which includes controls for a battery charger means 60 (shown in FIG. 1) to recharge the battery 19 when the portable battery power source 12 is not in use and for governing the supply of power from the battery 19.

The bottom panel 32 of the frame 12 is generally planar and rectangular in shape and supports a foot 40 extending downwardly therefrom to help maintain the portable battery power source 10 stationary while in an upright position. The foot 40 is fixedly attached at the midpoint of the front portion of the bottom panel 32. Integrally formed with the bottom panel 32 are a rear panel and a rear shelf (not shown), each being formed as a ninety-degree inward bend of the sheet of material that also forms the bottom panel 32. The housing also contains a cable compartment 36 for storing jumper cables 38 for use in connecting the battery 19 to an electrical load. U-shaped upper rear panel 30 forms the side walls of the cable compartment 36. Fasteners 35 and 22 hold the handle 14 and various panels and members forming the frame 12 in place. The various panels and members are preferably formed from sheet metal of sufficient thickness to provide a relatively rigid frame and housing for the device of the present invention.

Attached to one side member 26 is a locator flag 64, held in a flag bracket 62. Such a flag 64 is useful when the invention is used in a large parking lot, such as at a car dealer, fleet owner or shopping center. If the operator leaves the portable battery power source 10 between vehicles so that the frame 12 is no longer visible, then the locator flag 64 will be visible above the vehicles. The locator flag 64 might also help a person in need of starting assistance to locate a roving operator of a battery power source 10 in a large parking lot, so that a request for aid can be made.

The battery supporting tray 20 is generally rectangular and includes a rim 48 integrally formed along its outermost margin and a strap 52 for securely holding the battery 19 within the confines of the tray 20. Suspension members 21, 21 extend upwardly from the rim 48 at the ends of the tray 20 that are adjacent the side members 26, 26. The connection of the suspension members 21, 21 to the support members 11, 11 and the connection of the support members 11, 11 to the side members 26, 26 is the same at each side of the tray 20. Accordingly, the connection details for only one side are shown in FIG. 3. The upper end of each suspension member 21, 21 is rotatably connected to a respective adjacent support member 11, 11. Each support member 11, 11 is generally channel-shaped and has side flanges with flanged edges 75, 75 connected by fasteners 77, 77 to the corresponding side member 26. The lower end 72 of each support member rests on the bottom panel 32 and is connected there, preferably by a tab (not shown) that extends from the lower end 72 through the bottom panel 32 or by other suitable means. The rotatable connection between each suspension member 21, 21 and the corresponding support member 11, 11 is by a bolt 76, washer 82 and nut 84, with the bolt 76 passing through an offset tab 80 at the end of each suspension member 21, 21.

While not shown explicitly, it will be understood that electrical connections run from the terminals of the battery 19 to the cables 38 and to the charger means 60 and also to the control panel 27. Such matters are conventional and do not form a part of the present invention.

In operation, the portable battery power source 10 is manually wheeled to a motor vehicle needing a charge in the same manner as a handcart would be wheeled. That is, the user grasps the handle 14, tilts the frame 12 to lift the foot member 40 off the ground, and pushes the device in the desired direction, transported on the wheels 16, 18. When the portable battery power source 10 is angled backwards, the pair of suspension members 21, 21 pivot with respect to the support members 11, 11, thereby maintaining the battery 19 (securely fastened in the battery supporting tray 20 by strap 52) in a substantially level position. At the site of use, the portable battery power source 10 is placed upright so that the foot 40 contacts the ground and prevents rolling. If the location of the portable battery power source 10 is not level (e.g., on a ridge of ice or snow) the frame 12 may be tilted from a straight vertical position, but the battery 19 will still maintain a level position and be fully operational. Jumper cables 38 are removed from cable compartment 36 to deliver power from the battery 19 to the stalled car or other load. To return to its home site, the portable battery power source 10 is again moved in the manner of a handcart. Upon return the device 10 may be parked near an outlet for recharging of battery 19, should the device incorporate, as in the preferred embodiment, a charging device 60 (which may be any conventional charging device using line AC current as its power source operably connected to the battery 19) located in the space behind the control panel 27 at top panel 29. Alternatively, the battery 19 may be connected to a separate charger or may be removed by lifting front panel 31 and replaced with a freshly-charged battery.

Although the description of the preferred embodiment has been presented, it is contemplated that various alternatives, including those mentioned above, could be made without deviating from the spirit of the present invention. In particular, it is recognized that a variety of arms, platforms, clamps and other gimbal means for holding the battery 19 and suspending it for pivotal, leveling motion relative to a cart frame in a manner similar to the specifically disclosed embodiment may be devised. Also, a different configuration of wheels, or tracks or rollers could be provided as the transport means. It is desired, therefore, that the present embodiment be considered in all respects as illustrative, not restrictive, and that reference be made to the appended claims rather than the foregoing description to define the scope of the invention.

What is claimed and desired to be protected by Letters Patent is:

1. A portable battery power source, comprising:
   a frame comprising a bottom panel and a pair of side panels;
   means for transporting said power source connected to said frame;
   a handle attached to said frame for maneuvering the frame on said transport means; and
   gimbal means operably coupled to said frame for supporting a fluid containing battery in a substantially level position regardless of the angle of the frame, said gimbal means comprising:
      a battery supporting tray;
      two support members, comprising a pair of channel-shaped members, each extending upwardly from and generally perpendicular to said bottom panel of said frame and each having the side flanges thereof connected to one of said pair of side panels; and
      suspending means for pivotally suspending said tray from said support members, said suspending means extending from the tray and being operably connected to said support members.

2. The device as recited in claim 1 wherein said bottom panel includes at least one foot member extending downwardly therefrom.

3. The device as recited in claim 2, wherein said frame further comprises a front panel and a rear panel connected to said bottom panel.

4. The device as recited in claim 1 wherein said power source further comprises charging means operably connected to said battery for recharging said battery.

5. The device as recited in claim 1 wherein said power source further comprises a cable compartment for storing electrical cable means for connecting said battery to an electrical load.

6. The device as recited in claim 1 wherein said tray further comprises a strap operably coupled thereto for securing said battery in said tray.

7. The device as recited in claim 1 wherein said suspending means comprises a pair of suspension members, each having a first end extending from said tray and a second end pivotally coupled to one of said two support members.

8. The device as recited in claim 1, wherein the transport means comprises a pair of wheels connected for rotation on an axle operably connected to said frame.

9. A portable battery power source, comprising:
   a frame comprising a bottom panel, a pair of side panels and enclosing front and rear panels, said front and rear panels being connected to said side panels, said front panel being rotatably attached to said pair of side panels to provide access to the battery;

means for transporting said power source connected to said frame;

a handle attached to said frame for maneuvering the frame on said transport means; and gimbal means operably coupled to said frame for supporting a fluid containing battery in a substantially level position regardless of the angle of the frame, said gimbal means comprising:

a battery supporting tray;

two support members, each extending upwardly from and generally perpendicular to said bottom panel of said frame and each being attached to one of said pair of side panels; and suspending means for pivotally suspending said tray from said support members, said suspending means extending from said tray and being operably connected to said support members.

10. The device as recited in claim 9, wherein said bottom panel includes at least one foot member extending downwardly therefrom.

11. The device as recited in claim 10, wherein said front panel and said rear panel are connected to said bottom panel.

12. The device as recited in claim 9, wherein said power source further comprises charging means operably connected to said battery for recharging said battery.

13. The device as recited in claim 9, wherein said power source further comprises a cable compartment for storing electrical cable means for connecting said battery to an electrical load.

14. The device as recited in claim 9, wherein said tray further comprises a strap operably coupled thereto for securing said battery in said tray.

15. The device as recited in claim 9, wherein said suspending means comprises a pair of suspension members, each having a first end extending from said tray and a second end pivotally coupled to one of said support members.

16. The device as recited in claim 9, wherein the transport means comprises a pair of wheels connected for rotation on an axle operably connected to said frame.

* * * * *